United States Patent [19]
Nguyen et al.

[11] Patent Number: 6,021,327
[45] Date of Patent: Feb. 1, 2000

[54] MOBILE COMMUNICATION SYSTEM HAVING IMPROVED VISITOR LOCATION REGISTER CONTENT MANAGEMENT AND METHOD OF OPERATION

[75] Inventors: Nhut Nguyen; Patrick N. Sollee, both of Richardson; Stephen R. Kolski, Plano, all of Tex.

[73] Assignee: Nortel Networks Corporation, Montreal, Canada

[21] Appl. No.: 08/842,668

[22] Filed: Apr. 15, 1997

[51] Int. Cl.[7] .................................................. H04Q 7/22
[52] U.S. Cl. ............................ 455/433; 455/432; 455/439
[58] Field of Search .................................. 455/433, 432, 455/435, 436, 439

[56] References Cited

U.S. PATENT DOCUMENTS

| | | |
|---|---|---|
| 5,210,787 | 5/1993 | Hayes . |
| 5,353,331 | 10/1994 | Emery . |
| 5,400,390 | 3/1995 | Salin . |
| 5,428,665 | 6/1995 | Lantto ...................................... 379/58 |
| 5,537,610 | 7/1996 | Maager . |
| 5,557,654 | 9/1996 | Maenpaa ................................... 379/58 |
| 5,590,175 | 12/1996 | Gallant . |
| 5,600,705 | 2/1997 | Maenpaa . |
| 5,673,308 | 9/1997 | Akhavan ................................... 379/61 |
| 5,742,668 | 4/1998 | Pepe et al. ............................... 379/58 |
| 5,761,500 | 6/1998 | Gallant et al. .......................... 395/610 |
| 5,793,762 | 8/1998 | Penners et al. .......................... 370/389 |
| 5,815,810 | 9/1998 | Gallant et al. .......................... 455/433 |
| 5,819,178 | 10/1998 | Cropper .................................. 455/433 |
| 5,850,445 | 12/1998 | Chan et al. ............................... 380/23 |
| 5,850,603 | 12/1998 | Lantto et al. ............................ 455/433 |

*Primary Examiner*—Wellington Chin
*Assistant Examiner*—Congvan Tran
*Attorney, Agent, or Firm*—Bruce E. Garlick

[57] ABSTRACT

A wireless communication system includes at least one mobile switching center ("MSC"), at least one base station coupled to each MSC, a visitor location register ("VLR") and a visitor location register manager ("VLRM"). Each MSC couples to at least one base system controller ("BSC") which couples to at least one base transceiver station ("BTS"). Each BTS provides wireless communication within at least one respective cell, each of the plurality of mobile terminals communicating through a corresponding BTS, BSC and MSC when resident within a cell. The VLR corresponds to one of the MSCs and stores subscriber information for mobile terminals that are active in corresponding cells. The VLRM downloads, from a home location register, subscriber information for mobile terminals becoming active within one of a plurality of cells corresponding to the VLR and stores the subscriber information as a VLR record in the VLR. In accordance with the present invention, the VLRM selectively retains VLR records when corresponding mobile terminals becomes inactive within the cells corresponding to the VLR. The VLRM organizes the VLR records based upon a selected priority. In one embodiment, the VLR is organized as a linked list based upon the priority of VLR records. Stored on the basis of priority, the VLRM may delete VLR records on the same priority basis. In one embodiment of the present invention, a selected priority relates to the time stamp of last activity within any cell respective to the VLR.

20 Claims, 7 Drawing Sheets

MOBILE COMMUNICATION SYSTEM HAVING IMPROVED VISITOR LOCATION REGISTER CONTENT MANAGEMENT AND METHOD OF OPERATION

BACKGROUND

1. Technical Field

The present invention relates generally to the field of wireless communication systems and more particularly to an improved system and method of operation for managing the contents of a visitor location register contained within such a wireless communication system to achieve improved network capacity.

2. Related Art

Cellular based wireless communication systems are well known in the art. In the operation and management of a cellular communication system, a large number of mobile terminals, typically being battery powered, operate wirelessly throughout the system. Such systems typically include a number of mobile switching centers ("MSC") that provide high level management of a relatively large service area. As well as providing management functions, each MSC typically also provides an interface between the wireless communication system and the public switched telephone network ("PSTN"). In most applications, a plurality of base system controllers ("BSC") connect to each MSC and a plurality of base transceiver stations ("BTS") connect to each BSC, each BTS establishing a respective cell and facilitating wireless communications within the respective cell.

In a wireless communication system, subscriber information corresponding to mobile terminals is required for operation. Subscriber information for a particular mobile terminal is stored in a centralized database, commonly referred to as a home location register ("HLR"). Such subscriber information is established upon activation of the mobile terminal and resides within the HLR until removed upon deactivation. When a mobile terminal visits an area served by a particular MSC, the MSC retrieves respective subscriber information from the HLR and stores the subscriber information in what is referred to as a visitor location register ("VLR"). Subsequently, the MSC uses the subscriber information stored in the VLR to route calls to and from the mobile terminal as well as to validate calls initiated from within corresponding cells.

Prior art VLR management techniques typically retained retrieved subscriber information in the VLR only for so long as the respective mobile terminal remained active within the corresponding cells. However, once the mobile terminal ceased activity within the respective cells, the subscriber information stored within the VLR for the particular mobile terminal was deleted. Since the processing required to retrieve of records from the HLR was great and system resources were consumed in the retrieval and storage of the subscriber information in the VLR, network capacity was limited.

Thus, there is a need in the art for an improved system and technique for managing VLRs that not only more efficiently stores subscriber information within the VLR but that manages subscriber information within the VLR to minimize downloads from the HLR that increases the network capacity.

SUMMARY OF THE INVENTION

A wireless communication system enabling communicating with a plurality of mobile terminals according to the present invention includes at least one mobile switching center ("MSC"), at least one base station coupled to each MSC, a visitor location register ("VLR") and a visitor location register manager ("VLRM"). Each base station communicatively couples with each MSC and may include a base system controller ("BSC") and a base transceiver station ("BTS"). Each BTS provides wireless communication within a respective cell, each of the plurality of mobile terminals communicating through corresponding BTS, BSC and MSC when resident within a cell The VLR corresponds to one of the MSCs and stores subscriber information as VLR records for mobile terminals that are active in corresponding cells. The VLRM retrieves, from a home location register ("HLR"), subscriber information for each mobile terminal that becomes active within one of a plurality of cells corresponding to the MSC and stores the subscriber information in the corresponding VLR. In accordance with the present invention, the VLRM selectively retains the subscriber information when the mobile terminal becomes inactive within the plurality of cells served by the VLR. Thus, for mobile terminals that transition from being active, to being inactive and then to being active within corresponding cells, the VLRM may reuse subscriber information corresponding to the mobile terminal, avoiding the resource consuming retrieval of the information from the HLR. Because valuable resources within the MSC are not consumed by this task, improved network capacity is realized.

The VLRM according to the present invention actively manages the VLR records to minimize information retrieval from the HLR. VLR records remain within the VLR based upon a selected criteria and are deleted only when additional storage is required within the VLR. Deletion of VLR records is based on the selected criteria so that higher priority records within the VLR are retained while lower priority records are deleted.

In an exemplary embodiment, the VLRM organizes the VLR records as a linked list, the ordering of VLR records based upon the selected criteria. In one example, the VLRM orders the VLR records based on the age of each record. The age of a record may be defined as the elapsed time since the last network activity of a respective mobile terminal within the cells served by the VLR. As mobile terminals become active or operate within cells corresponding to the VLR, the VLR records are reordered so that the priority is retained based upon the selected criteria. In such a scenario, the criteria for deletion would be to sequentially delete the oldest records within the VLR. Using the described linked list structure example, the deletion of the oldest records in a sequential manner from oldest record, to next oldest record, etc., is quick and effective, thereby allowing the VLRM to meet the required real-time constraints.

Required deletion of records within the VLR may be triggered by a VLR registration request from a mobile terminal roaming into the cells served by the VLR, when the VLR fills beyond a threshold (e.g. when completely full), or by a periodically run provisioning process. A provisioning process may run during low traffic hours of the MSC to delete VLR records and thereby free storage locations within the VLR. For example, the provisioning process may execute once a day to create vacancies in the VLR for the next day. Such provisioning process may operate to create a particular number of vacancies or to free a designated portion of the VLR. The determination of such freed portion based upon expected roaming traffic to be encountered, expected non-roaming traffic and other historical factors. For example, a provisioning process operating with respect to VLR A may be adjusted to free 10% of the capacity of VLR A for next day roaming activity while a provisioning process operating with respect to VLR B may be adjusted to free 20% of the capacity of VLR B, VLR B historically having more roaming traffic than VLR A.

The VLRM may also be required to delete records during normal operation when a VLR registration request is received but the VLR is full. In such a case, the VLRM deletes a number of VLR records to make room in the VLR to accommodate records corresponding to the newly arrived mobile terminal(s). In each case, however, the selected criteria upon which VLR organization is based is used in determining which VLR records to delete. By organizing the VLR in a linked list upon such selected criteria, VLR records may be readily deleted to create vacancies in the VLR.

Moreover, other aspects of the present invention will become apparent with further reference to the drawings and specification which follow.

DETAILED DESCRIPTION OF THE DRAWINGS

Figure 1:
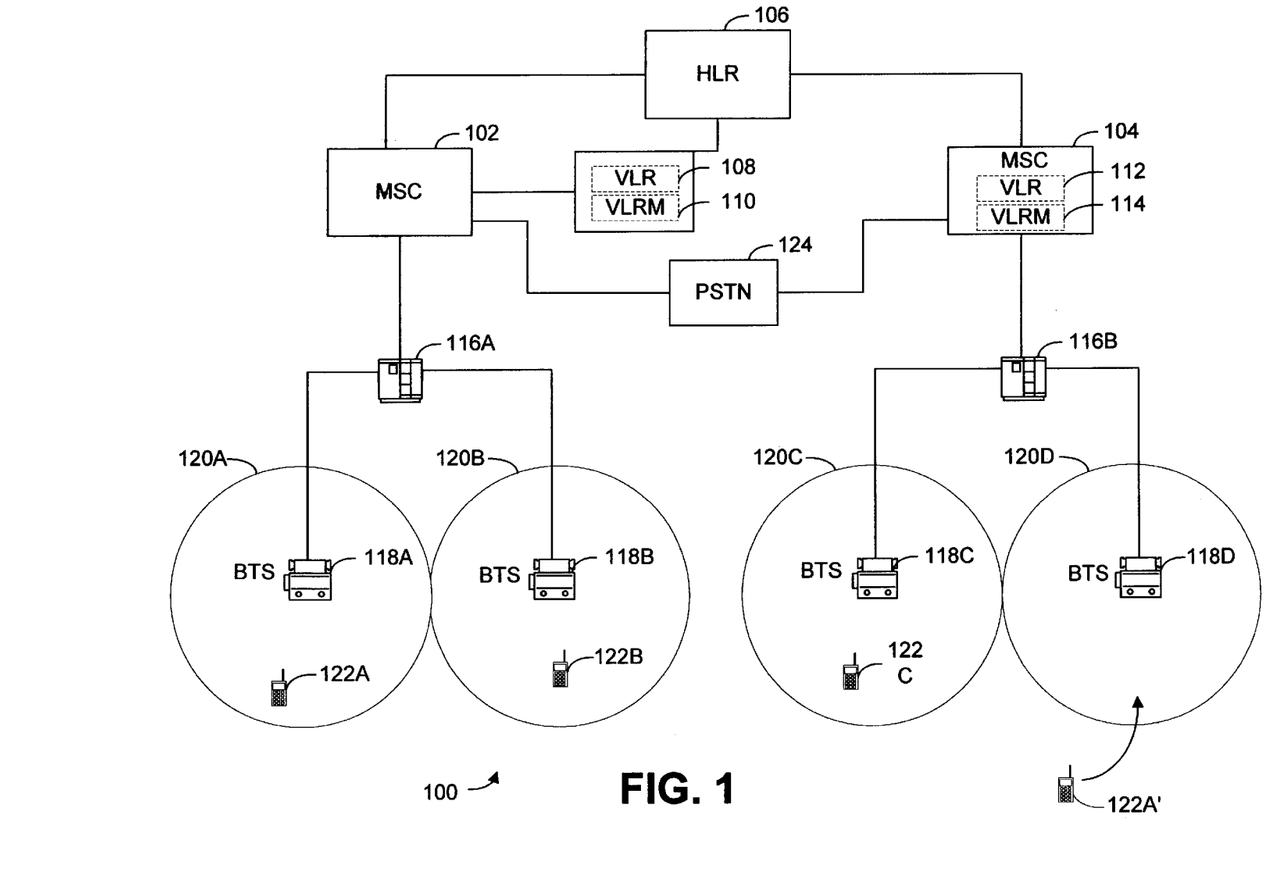
FIG. 1 is a block diagram illustrating a wireless communication system according to the present invention having a visitor location register and a visitor location register manager.

FIG. 1 illustrates a wireless communication system 100 according to the present invention for communicating with a plurality of mobile terminals. The wireless communication system 100 includes first and second mobile switching centers ("MSCs") 102 and 104 that connect to a home location register ("HLR") 106. The system 100 also includes a base switching center ("BSC") 116A that connects to MSC 102 and a BSC 116B that connects to MSC 104. In other embodiments, a plurality of BSCs may connect to each MSC to expand the effective area served by the MSC.

The wireless communication system 100 also includes base transceiver stations ("BTS") 118A and BTS 118B that connect to BSC 116A to establish corresponding communication cells (hereinafter, "cells") 120A and 120B, respectively. Further, the system 100 includes BTS 118C and BTS 118D that connect to BSC 116B to establish corresponding cells 120C and 120D, respectively. Within any of the cells 120A–D, mobile terminals 122A–C may wirelessly communicate. Further, each of the MSCs 102 and 104 may also connect to a public switched telephone network ("PSTN") 124 that facilitates communication between the plurality of mobile terminals 122A–C as well as communications between any of the mobile terminals 122A–C and wired telephones. A communication between mobile terminals 122A and 122C, for example, would include the routing of signals through BTS 118A, BSC 116A, MSC 102, PSTN 124, MSC 104, BSC 116B and BTS 118C. A communication between any of the mobile terminals and a wired telephone would be routed similarly, but would terminate in the PSTN 124.

In order to track mobile terminals 122A–C within the wireless communication system 100, the system 100 includes visitor location registers ("VLR") 108 and 112 as well as visitor location register managers ("VLRM") 110 and 114. As shown, in one embodiment VLR 108 and VLR 110 reside external to MSC 102, while in another embodiment, VLR 112 and VLRM 114 reside internal to MSC 104. Stored within the VLR 108 are VLR records that include subscriber information for each mobile terminal operating within corresponding cells. Upon the first registration request of a mobile terminal 112A within a cell, 120A, for example, respective to particular MSC 102, the VLRM 110 retrieves respective subscriber information from the HLR 106, stores the subscriber information within the corresponding VLR 108 as a VLR record and makes the information available to the MSC 102. Using the respective subscriber information, the MSC 102 validates, routes and otherwise manages communications with the mobile terminal 122A.

Mobile terminals 122A through 122C may roam amongst the plurality of cells 120A through 120D. At any given time, a particular mobile terminal, mobile terminal 122A, for example, may reside within any of the cells. FIG. 1 illustrates mobile terminal 122A residing at a first time within cell 120A and, at a second time, moving into cell 120D. The mobile terminal 122A is referenced with numeral 122A' as moving into cell 120D. Servicing the mobile terminal 122A' when it moves into cell 120D requires additional information retrieval and processing.

When the mobile terminal 122A first becomes active in cell 120A, it initiates communication with BTS 118A. BTS 118A relays the communication to MSC 102 via BSC 116A and MSC 102 attempts to service the mobile terminal by processing an registration request. To process the registration request, the VLRM 110 (located external to the MSC 102 in the example but that could otherwise reside within the MSC 102 as illustrated with respect to MSC 104 and VLRM 114) searches VLR 108 seeking subscriber information for the mobile terminal 122A. Since the request is the first communication within any cell corresponding to the MSC 102, no respective subscriber information resides in the VLR 108 and the VLRM 110 downloads subscriber information for the mobile terminal 122A from the HLR 106. Upon receipt, the VLRM 110 stores the subscriber information as a VLR record in the VLR 108. The MSC 102 then validates the activity of the mobile terminal 122A and enables and processes any desired communication. When the mobile terminal 122A' becomes active within cell 120D, a similar sequence of events occurs wherein subscriber information is requested by VLRM 114, received and stored in VLR 112.

Downloading subscriber information, processing the subscriber information and storing the subscriber information requires substantial system resources and reduces system performance. Thus, the VLRM 110 according to the present invention selectively retains VLR records within the VLR 108 after the mobile terminal 122A has become inactive within any of the cells corresponding to the VLR 108. Such operation provides great benefits when mobile terminals frequently move among cells that are served by more than one VLR, for example cell 120B served by VLR 108 that lies adjacent cell 120C that is served by VLR 112. For example, mobile terminal 122A may operate within cell 120A for a period and then move from cell 120A to cell 120B. Upon requesting service within cell 120B, respective subscriber information previously stored within VLR 108 exists. Thus, the MSC 102 and VLRM 110 need not download subscriber information from the HLR 106. However, when the mobile terminal 122A roams from cell 120A to cell 120D and back into cell 120A, a period of time has elapsed. In prior art systems, the respective subscriber information may have been purged from the VLR 108. However, according to the present invention, the VLRM 110 retains VLR 108 records for reuse, such reuse relieving the system 100 of frequently downloading subscriber information.

The VLRM 110 retains inactive records within the VLR 108 based upon the priority of VLR records, such priority determined by a selected criteria. One such criteria that may be selected relates to the age of each record. When communicating with an MSC, VLR records for a particular mobile terminal, 122A, for example, are accessed. At the time of such access, the VLRM 110 stamps the particular VLR 108 record associated with mobile terminal 122A with a transaction time stamp. The priority of the record relative to all other VLR records is then based upon the transaction time stamp. In other priority schemes, the VLRM 110 may prioritize VLR 108 records based upon frequency of communications within respective cells, a subscription criterion determined by expected "home" cells of the mobile terminal, the proximity of home cells to the cells being served by a particular VLR and other such factors as may be prudent for the operation of particular systems.

By retaining VLR 108 records in this manner, the VLR 108 may occasionally fill. Thus, in order to conserve valuable resources allocated to the VLR 112 while accommodating mobile terminals roaming into served cells, the VLRM 110 selectively deletes records from the VLR 112. Such selective deletion may occur when mobile terminal 122B becomes active for a first time in a cell corresponding to a VLR 108 that is full. In such a case, the VLRM 110 deletes the lowest priority VLR record within the VLR 108 to make room for subscriber information respective to the newly active mobile terminal 122B. Similarly, on a periodic basis, in order to provide sufficient vacancies within the VLR 108, the VLRM 110 deletes records from the VLR 108 to make room for additional records to accommodate roaming mobile terminals.

Thus, as opposed to the prior VLR management techniques, the VLRM 110 of the present invention more efficiently utilizes resources available for the VLR 108, minimizes system resource consumption associated with downloading subscriber information from the HLR 106, efficiently frees VLR 108 resources and thereby reduces network traffic and processing time required for operation within wireless communication system of the present invention. Resultantly, the VLRM 110 according to the present invention increases network capacity.

Figure 2A:
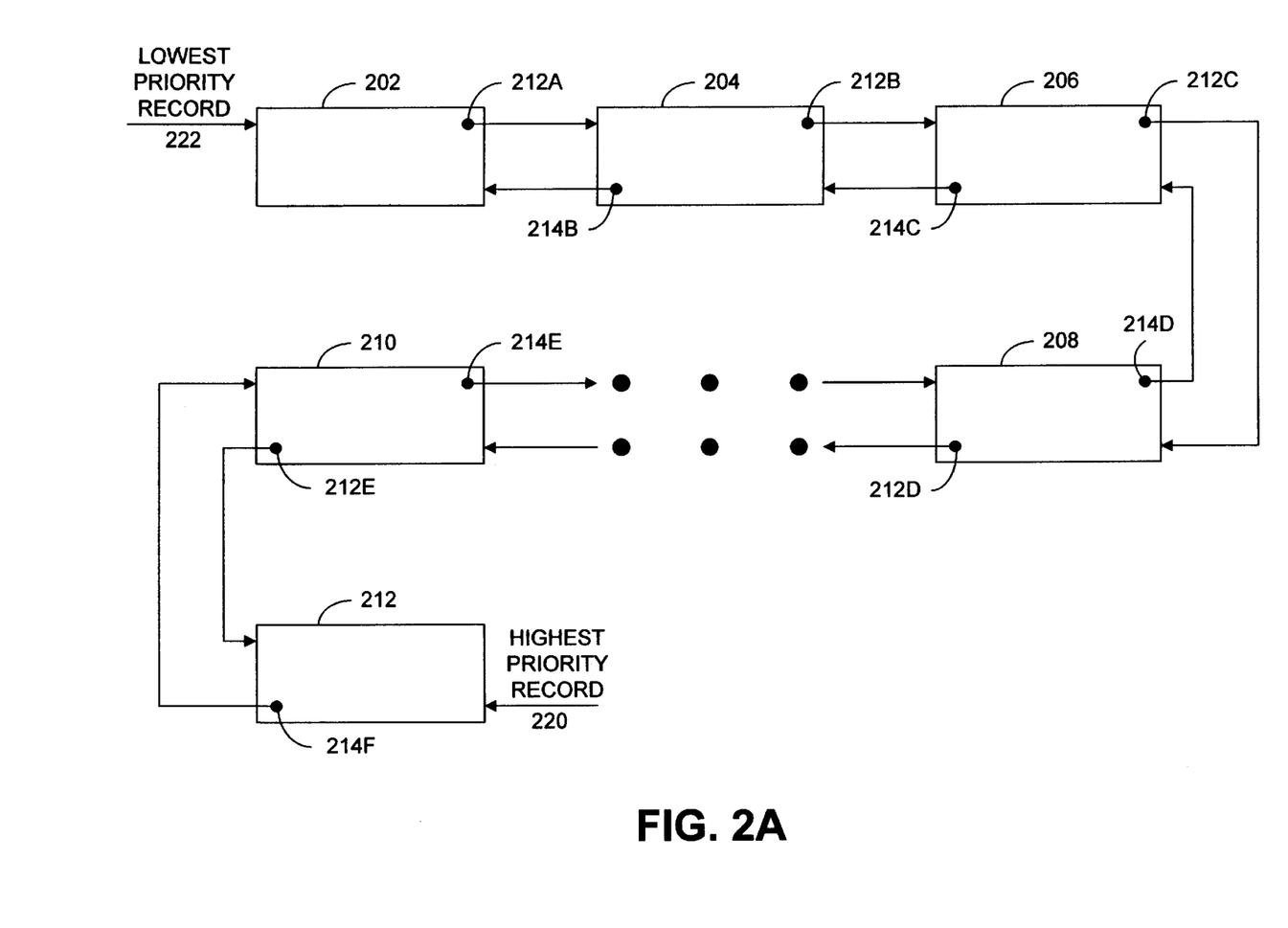
FIG. 2A is a block diagram illustrating the organization of visitor location register records in a linked-list according to a selected criteria.

FIG. 2A illustrates, conceptually, the organization of VLR records in the wireless communication system 100 according to the present invention. For simplicity in description, only VLR records 202, 204, 206, 208, 210 and 212 are illustrated. In an actual implementation, many more VLR records would be stored and managed. As is shown, VLR records 202 through 212 are organized as a sorted linked list based upon a selected priority.

Figure 2B:
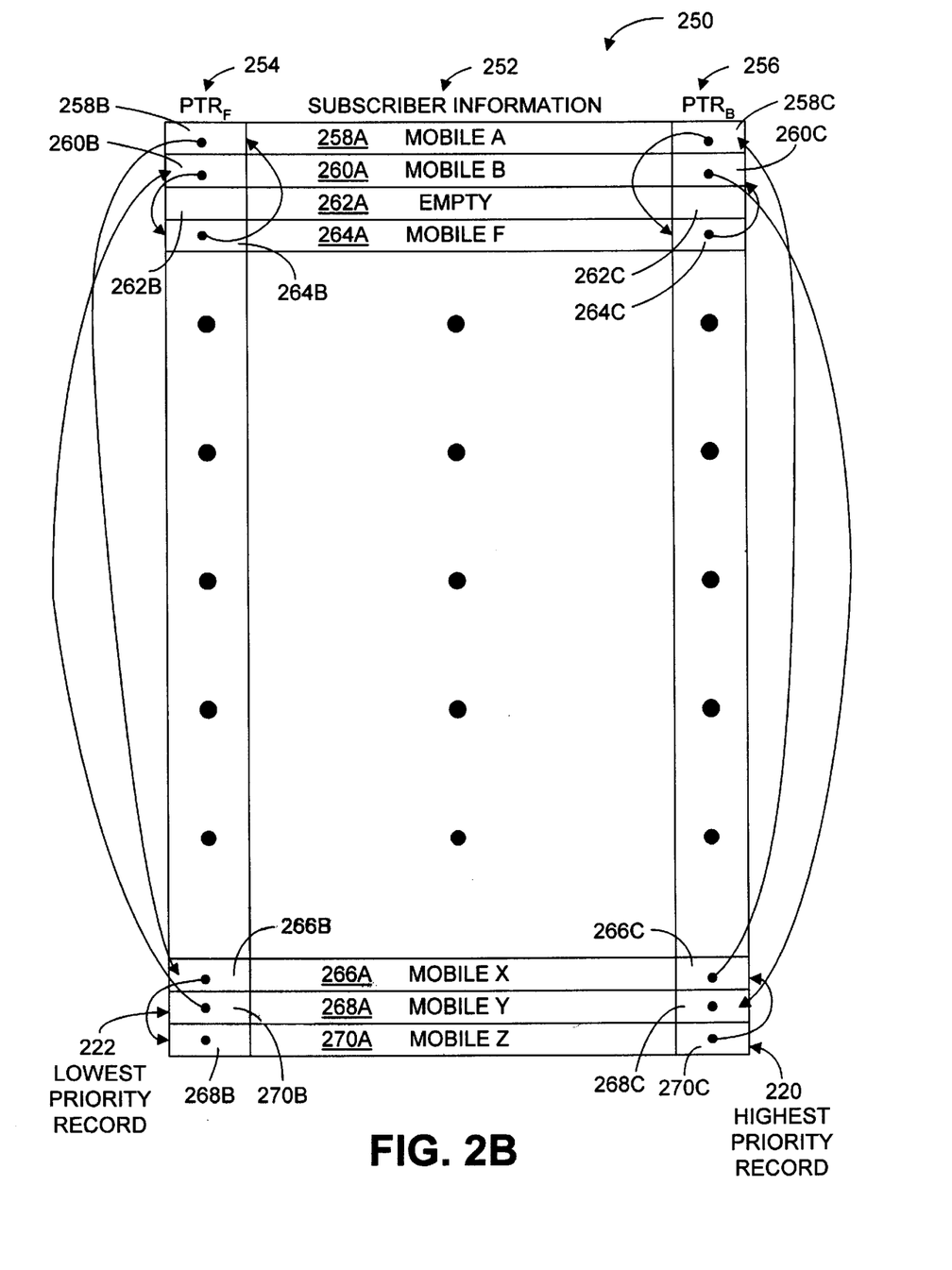
FIG. 2B is a block diagram illustrating an exemplary structure of the visitor location register according to the present invention.

One example of such a priority is record age. As previously described, age may determined based upon the last activity of a mobile terminal respective to a particular VLR 108. Assuming that age is used in determining priority of records within the VLR 108, the VLRM 110 creates and maintains pointers for each VLR record 202–212 to track the priority of the VLR records. As shown in FIG. 2B, each VLR record 202–212 includes two pointers. Forward pointers, referenced as 212A, 212B, 212C, 212D or 212E, point to the next newer VLR record 202–212 while backward pointers 214B, 214C, 214D, 214E and 214 F point to the next older VLR record 202–212. Further, a LOWEST PRIORITY RECORD pointer 222 points to the oldest VLR record 222 while a HIGHEST PRIORITY RECORD pointer 220 points to the newest VLR record 212. Thus, in the management of the VLR 108 according to the present invention, VLR records 202–212 may be easily sorted, deleted and otherwise managed on the basis of the relative ages of the VLR records within the VLR 108. However, in other embodiments, additional or other priorities may be employed as contrasted to age.

FIG. 2B illustrates generally the construction of a VLR 250 according to the present invention wherein record age is used as an indicia of priority. Each VLR record includes subscriber information 252, a forward pointer 254, and a backwards pointer 256. The subscriber information 252, as previously described, includes information required by a particular MSC in establishing communication with a mobile terminal within its corresponding cells. Subscriber information is known in the art and will not be further described herein except to expand upon the teachings of the present invention.

The VLR 250 of FIG. 2B includes subscriber information 252, forward pointers 254 and backwards pointers 256 for mobile terminal A, mobile terminal B, mobile terminal F, mobile terminal X, mobile terminal Y, and mobile terminal Z. The VLRM 110 further tracks vacancies within the VLR 108. As shown, the VLRM 110 determines that subscriber information for mobile A, mobile B, mobile F, mobile X, mobile Y and mobile Z is stored at 258A, 260A, 264A, 266A, 268A and 270A, respectively, and determines that VLRM record 262A is empty.

Forward pointers 254 and backward pointers 256 for each of the described entries are assigned, reviewed and/or updated after every activity with cells corresponding to the VLR 250. Forward pointers 258B, 260B, 264B, 266B, 268B and 270B point from a respective VLR record to a next newer VLR record while backward pointers 258C, 260C, 264C, 266C, 268C and 270C point from a respective VLR record to a next older VLR record. Thus, with respect to these particular entries, the VLR record associated with mobile Z is the newest, being pointed to by newest record 220. The backwards pointer 270C associated with mobile Z points to the VLR record associated with mobile X 266A, the backwards pointer 266C associated with mobile X points to the VLR record associated with mobile A 258A, the backwards pointer 258C associated with mobile A points to the VLR record associated with mobile F 264A, the backwards pointer 264C associated with mobile F points to the VLR record associated with mobile B 260A, and finally the backwards pointer 260C associated with mobile B points to the VLR record associated with mobile Y 268A, the oldest record.

Likewise, the VLR record associated with mobile Y is the oldest, being pointed to by oldest record 220. The forward pointer 268B associated with mobile Y points to the VLR record associated with mobile B 260A, the forward pointer 260B associated with mobile B points to the VLR record associated with mobile F 264A, the forward pointer 264B associated with mobile F points to the VLR record associated with mobile A 258A, the forward pointer 258B associated with mobile A points to the VLR record associated with mobile X 266A, and finally the forward pointer 266B associated with mobile X points to the VLR record associated with mobile Z 270A, the newest record.

As is shown, empty record 262A resides within the VLR 250. This record may be subsequently filled when another mobile terminal becomes active within one of the cells corresponding to the VLR 250. Further, the VLR manager 110 may delete one or more records contained within the VLR 250 to establish additional empty space that may be further used to store subscriber information for particular mobile terminals.

Figure 3:
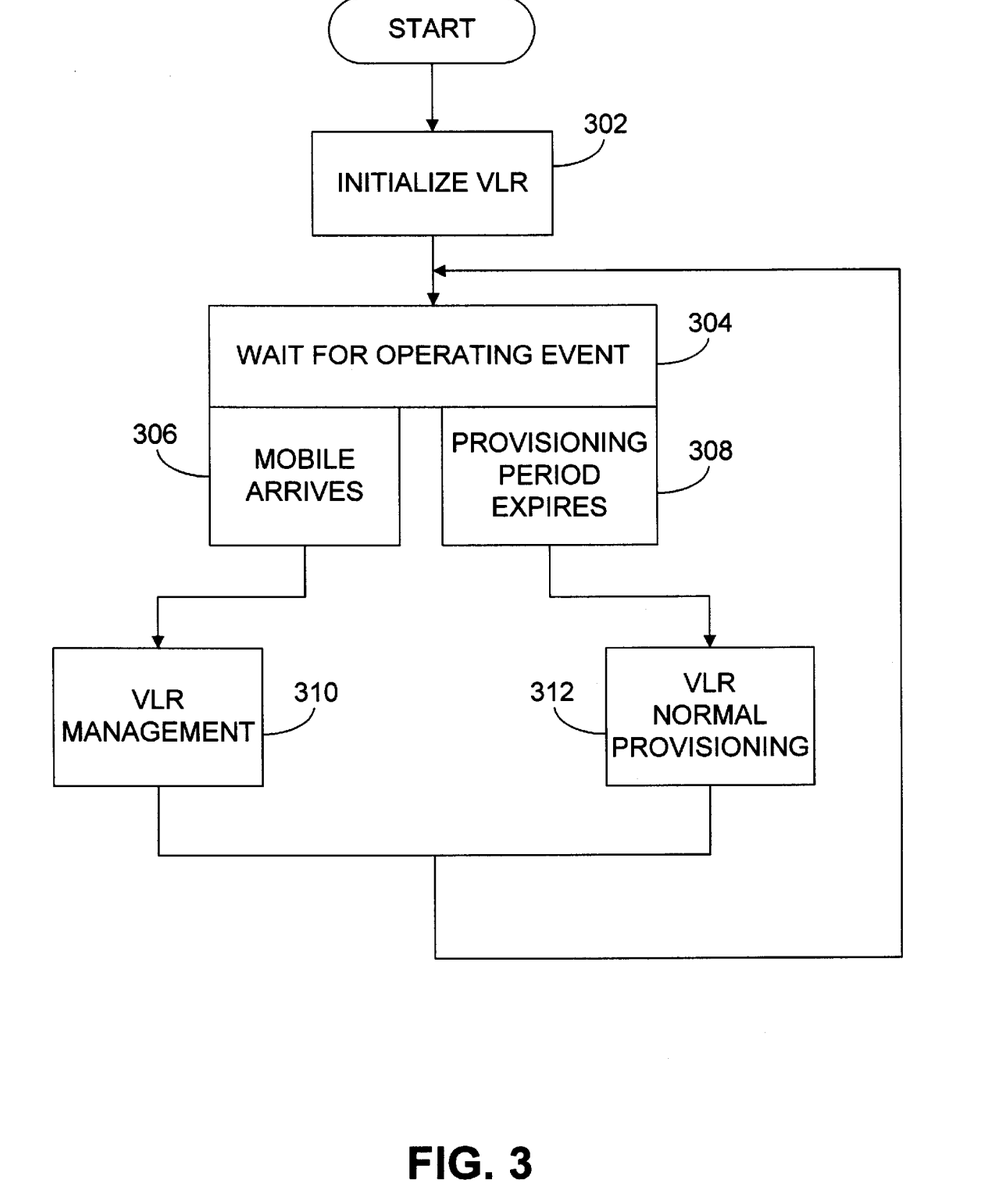
FIG. 3 is a flow diagram illustrating generally the operation of the visitor location register manager of the wireless communication system according to the present invention.

FIG. 3 illustrates, generally, operation of the VLRM 110 according to the present invention 300. After starting operation, the VLRM 110 initializes the VLR at 108 step 302. As was described in FIG. 1, the VLR and VLRM for a respective MSC may reside at the same physical location as the MSC, such as with MSC 104, VLR 112 and VLRM 114, or may reside at a different physical locations, such as the case with MSC 102, VLR 108 and VLRM 110. Operation of each VLRM 110 and 114 differs only as to the particular implementation required. Further references are made only to VLRM 110 but apply equally to both VLRM 110 and VLRM 114.

The VLRM 110 may be implemented in software or a combination of software and hardware. The allocation of memory for the VLR 108 may be performed using software operations while the physical storage capability provided by the VLR 108 is provided with hardware. For access time minimization, the VLR 110 may include dynamic memory having an access time sufficient for the requirements of the present invention.

After initialization at step 302, the VLRM waits for an event at step 304. A first type of event occurs at step 306 wherein a mobile terminal initiates activity within a cell corresponding to the VLR 108. The arrival of a mobile terminal within one of the cells corresponding to the VLR 108 requires the VLR registration management of step 310. Step 310 will be further described in the figures.

Alternately at step 304, a period may expire at step 308 associated with the management of the VLR 108. Once this period expires at step 308, normal provisioning is performed at step 312. Such normal provisioning will be further described hereinafter with reference to the FIG. 5. Once either step 310 of 312 is accomplished, the method returns to step 304 to wait for another event.

Figure 4:
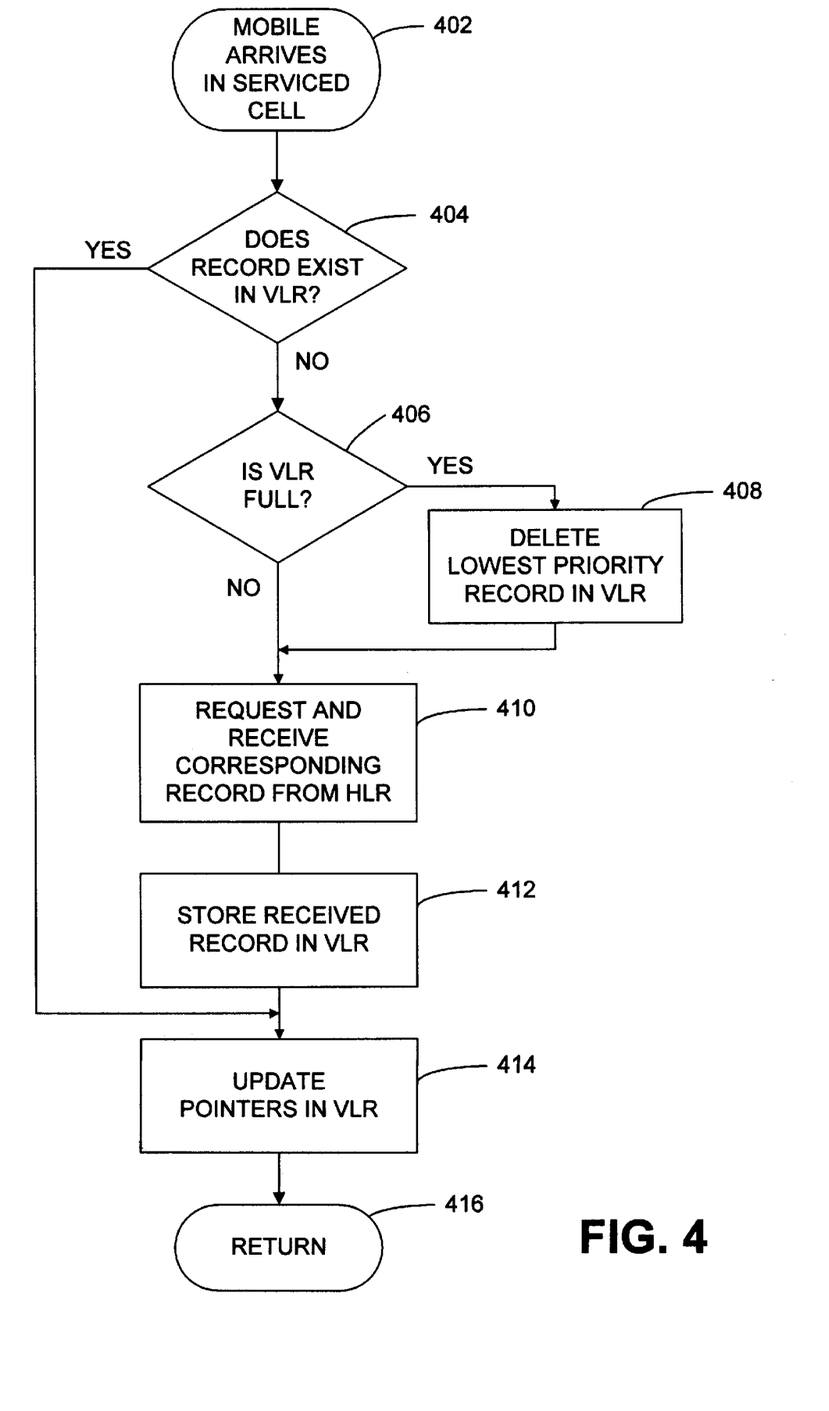
FIG. 4 is a flow diagram illustrating operation of the visitor location register manager upon receiving a registration request from a mobile terminal operating within one of the cells of the wireless communication system corresponding to the visitor location register.

FIG. 4 illustrates operation of the VLRM 110 during VLR registration management as previously described with reference to numeral 310 of FIG. 3. When a mobile terminal becomes active within one of the cells corresponding to the VLR 108 at step 402, the VLRM 110 determines whether or not subscriber information exists in the VLR 108 for the particular mobile terminal at step 404. If the subscriber information does exist for the particular mobile terminal, the method proceeds to step 414 wherein pointers are updated and the VLRM 110 returns at step 416. However, if at step 404 no record exists for the particular mobile terminal, the VLRM 110 determines whether or not the VLR 108 is full at step 406. If the VLR 108 is full at step 406, the VLRM 110 proceeds to step 408 wherein the lowest priority record contained within the VLR 108 is deleted. As is recalled, the VLRM 110 keeps an LOWEST PRIORITY RECORD pointer 222 that points to the oldest VLR record. Thus, using the LOWEST PRIORITY RECORD pointer 222, the lowest priority record of the VLR may be efficiently and quickly deleted. Upon such deletion, the LOWEST PRIORITY RECORD pointer 222 is adjusted to point to the next lowest priority record within the VLR 108.

From step 408 the method proceeds to step 410 wherein the mobile terminal information is retrieved from the HLR 106. From step 410, operation proceeds to step 412 wherein the subscriber information for the particular mobile terminal is stored in the VLR 108 as the newest VLR record. Once the VLR record is stored, the pointers within the particular VLR record are updated to indicate that the particular record is the newest record within the VLR 108. Further, the HIGHEST PRIORITY RECORD pointer 220 and pointers in the next newest record are updated. From step 414, operation proceeds to step 416 wherein the VLRM 110 returns.

Figure 5:
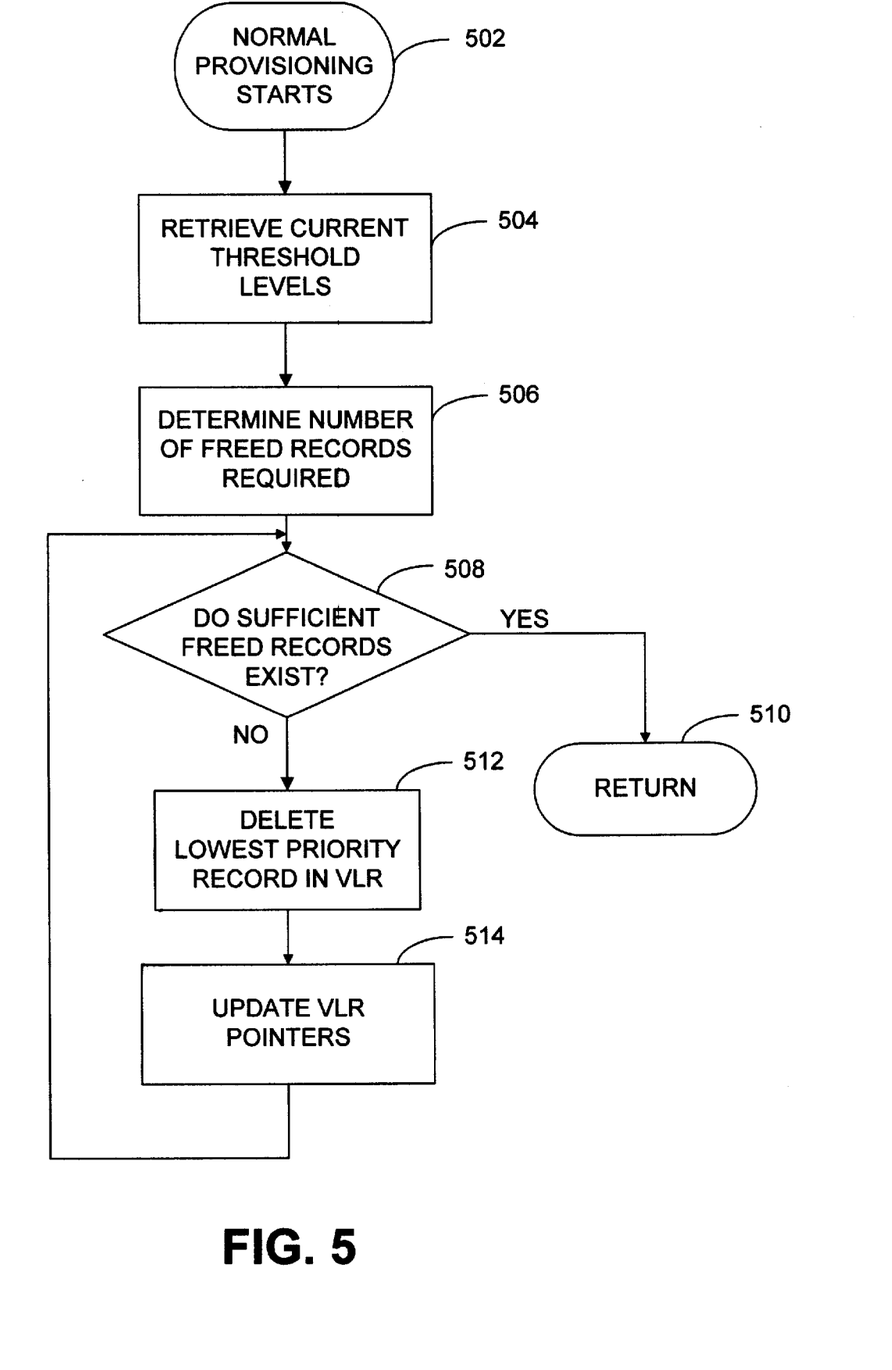
FIG. 5 is a flow diagram illustrating operation of the visitor location register during a provisioning process according to the present invention.

FIG. 5 illustrates the execution of normal provisioning of the VLR 108 by the VLRM 110, such provisioning previously described with reference to step 312 of FIG. 3. Normal provisioning commences at the expiration of a particular time period or processing period within which the operator of the VLRM 110 determines provisioning is appropriate. An example of such provisioning period may be the expiration of a 24 hour period, at such time the usage of the wireless communication system at a minimum to avoid conflict with other operations and access of the VLR 108. During such minimal operation period the operation upon the VLR 108 may be accomplished with little disruption to the normal functionality of the VLR 108. However, as opposed to a 24 hour period, such provisioning may be accomplished on a weekly basis, a bi-daily basis, or at another interval over which the operator of wireless communication system determines such normal provisioning is appropriate.

When it is determined that normal provisioning is required at step 502 the VLRM 110 retrieves the threshold information at step 504. This threshold information will notify the VLRM 110 as to what level of management is required for the particular VLR 108. Depending upon the activity within the cells associated with the VLR 108, it may be appropriate to allocate a large percentage of the VLR 108 for additional VLR records that will be added during the subsequent operating period prior to subsequent provisioning. Such thresholds may vary from VLR to VLR based upon the particular traffic conditions of the cells associated with the VLR.

At step 506, based upon the threshold level received at step 504, the VLRM 110 calculates the number of vacancy records required to meet the threshold. As an example of such operation, an operator of the wireless communication system may determine that on a daily basis, ten percent of the VLR 108 must be free for additional roaming traffic to be accommodated during the next daily period. If the VLR 108 has space for ten thousand entries, after provisioning, one thousand VLR records must be available for operation during the next day.

From step 506, the VLRM 110 moves to step 508 wherein it is determined whether enough records are freed to meet the threshold requirement as calculated at step 506. If sufficient records are already freed, the method proceeds to step 510 where it returns. However, if at step 508 the VLRM 110 determines that additional records must be freed, the next lowest priority record is deleted at step 512. For example, with reference again to FIG. 2A, step 510 in deleting the next lowest priority record would look to pointer LOWEST PRIORITY RECORD pointer 222 that points to VLR record 202. After the deletion operation of step 510, the LOWEST PRIORITY RECORD pointer 222 is adjusted at step 514. From step 514 the method proceeds again to step 508 where it is determined whether or not enough records have been freed. If at this point enough records have been freed the VLRM 110 moves to step 510 where it returns. Thus, after completion of the steps of FIG. 5, the VLR 108 includes sufficient vacancies to meet the threshold.

Figure 6:
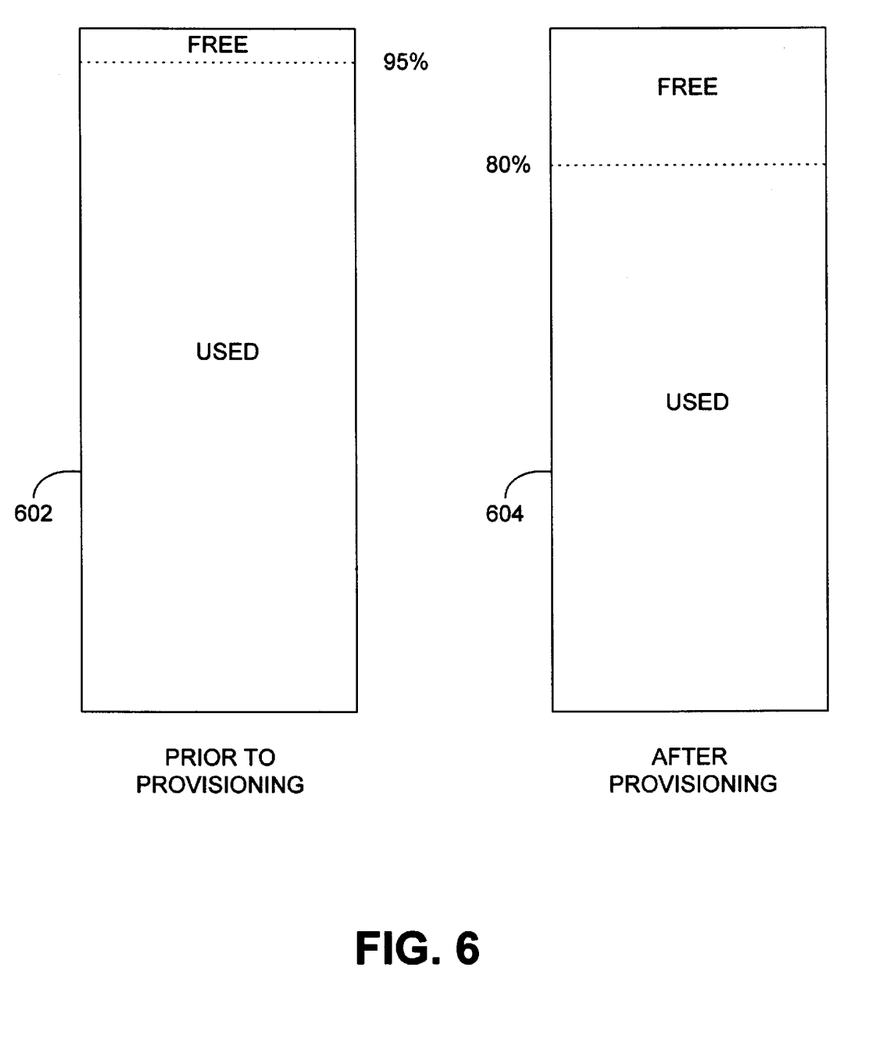
FIG. 6 is a flow diagram illustrating generally the affect of the provisioning process on the visitor location register.

FIG. 6 illustrates generally the VLR 600 prior to and after provisioning operations. For example, the VLR at state 602 is ninety-five percent filled with subscriber information with five percent free. After a provisioning operation, wherein the threshold requires twenty percent (20%) free space, as illustrated at numeral 604, eighty percent of the VLR 108 is still occupied while twenty percent if free.

In another embodiment, the VLRM 110 periodically determines usage of the VLR 108 between provisioning periods. These determinations are recorded and relayed to the system operator so that the thresholds may be selected to optimize operation of the VLR 108. Because the cost of downloading records from the HLR is high, it is beneficial to have the VLR 108 as full as possible at all times. Thus, if it is determined that only three percent of the VLR is filled on a daily basis on the average, a system operator may set the threshold for normal provisioning at ninety-seven percent of the particular VLR 108. This percentage may change from VLR to VLR depending upon the particular usage.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A wireless communication system for communicating with a plurality of mobile terminals comprising:
   at least one mobile switching center;
   at least one base station communicatively coupled with each mobile switching center, each base station providing wireless communications within at least one respective cell, each of the plurality of mobile terminals communicating through a corresponding base station and corresponding mobile switching center when resident within a cell;
   a visitor location register corresponding to one of the mobile switching centers; and
   a visitor location register manager that downloads, from a home location register, subscriber information for a plurality of mobile terminals active within corresponding cells, that stores the subscriber information as visitor location register records in the visitor location register, that organizes the visitor location register records based upon a prioritization of the visitor location register records, and that periodically deletes a first plurality of visitor location register records that have a lower priority than a second plurality of visitor location records, the second plurality of visitor location records not deleted from the visitor location register.

2. The wireless communication system of claim 1, wherein older visitor location resister records are prioritized lower than newer visitor location register records and wherein an age of a visitor location register record is based upon a time since last activity of a corresponding mobile unit within an area served by the visitor location register.

3. The wireless communication system of claim 1, the visitor location register manager removing at least one visitor location register record from the visitor location register when the visitor location register becomes full.

4. The wireless communication system of claim 1, wherein the first plurality of visitor location register records are deleted to provide a predetermined number of vacancies in the visitor location register.

5. The wireless communication system of claim 4, wherein the predetermined number of vacancies is determined based upon an expected number of new subscriber records to be stored in the visitor location record over a next time period.

6. The wireless communication system of claim 1, the visitor location register manager organizing visitor location register records in the visitor location register as a linked list based upon respective priority of the visitor location register records.

7. The wireless communication system of claim 6, the visitor location register manager periodically removing visitor location register records from the visitor location register to provide a predetermined number of vacancies within the visitor location register by sequentially removing next lowest priority records from the visitor location register until a vacancy threshold is met.

8. The wireless communication system of claim 7, the visitor location register manager removing at least one visitor location register record when visitor location register contents exceed a threshold level.

9. The wireless communication system of claim 7, each visitor location register record including a pointer to a next higher priority visitor location register record and a pointer to a next lower priority visitor location register record.

10. In a wireless communication system having at least one mobile switching center, at least one base station communicatively coupled with each mobile switching center, with each base station providing wireless communications within at least one respective cell and with each of the plurality of mobile terminals communicating through a corresponding base station and a corresponding mobile switching center when resident within a cell, and a home location register, a visitor management system comprising:
   a visitor location register corresponding to one of the mobile switching centers; and
   a visitor location register manager that downloads, from a home location register, subscriber information for a mobile terminal active within one of a plurality of cells corresponding to the visitor location register, that stores the subscriber information as a visitor location register record in the visitor location register, that prioritizes the visitor location register record with respect to other visitor location register records stored in the visitor location register, and that periodically deletes a first plurality of visitor location register records that have a lower priority than a second plurality of visitor location records, the second plurality of visitor location records not deleted from the visitor location register.

11. The visitor management system of claim 10, wherein older visitor location register records are prioritized lower than newer visitor location resister records and wherein an age of a visitor location resister record is based upon a time since last activity of a corresponding mobile unit within an area served by the visitor location register.

12. The visitor management system of claim 10, the visitor location register manager removing at least one visitor location register record from the visitor location register when the visitor location register is full and storage of additional subscriber information is required.

13. The visitor management system of claim 10, the visitor location register manager organizing visitor location register records in the visitor location register as a linked list based upon priority of a respective mobile terminal within the plurality of cells corresponding to the visitor location register.

14. The visitor management system of claim 13, the visitor location register manager periodically removing visitor location register records from the visitor location register to provide a predetermined number of vacancies within the visitor location register by sequentially removing next oldest records from the visitor location register until a vacancy threshold is met.

15. The visitor management system of claim 13, each visitor location register record including a pointer to a next higher priority visitor location register record and a pointer to a next lower priority visitor location register record.

16. In a wireless communication system having at least one mobile switching center, at least one base station communicatively coupled with each mobile switching center with each base station providing wireless communications within at least one respective cell and with each of the plurality of mobile terminals communicating through a corresponding base station and corresponding mobile switching center when resident within a cell, a home location register and a visitor location register, a visitor management method comprising the steps of:

upon activity of a mobile terminal within a cell corresponding to the visitor location register, downloading, from a home location register, subscriber information for the mobile terminal;

storing the subscriber information as a visitor location register record in the visitor location register;

organizing visitor location register records based upon respective priorities; and periodically deleting a first plurality of visitor location register records that have a lower priority than a second plurality of visitor location records, the second plurality of visitor location records not deleted from the visitor location register.

17. The method of claim 16, further comprising the step of:

prioritizing older visitor location register records lower than newer visitor location register records, wherein an age of a visitor location register record is based upon a time since last activity of a corresponding mobile unit within an area served by the visitor location register.

18. The method of claim 16, wherein the first plurality of visitor location register records are deleted to provide a predetermined number of vacancies in the visitor location register.

19. The method of claim 16, further comprising the step of:

removing at least one visitor location register record from the visitor location register when the visitor location register is full and storage of additional subscriber information is required.

20. The method of claim 16, further comprising the step of:

organizing visitor location register records in the visitor location register as a linked list based upon priority of respective visitor location register records.

* * * * *